July 19, 1966  E. H. TALBERT  3,261,487
TRANSPORTING DEVICE AND ACCESSORY ELEMENTS
Filed June 22, 1964  2 Sheets-Sheet 1
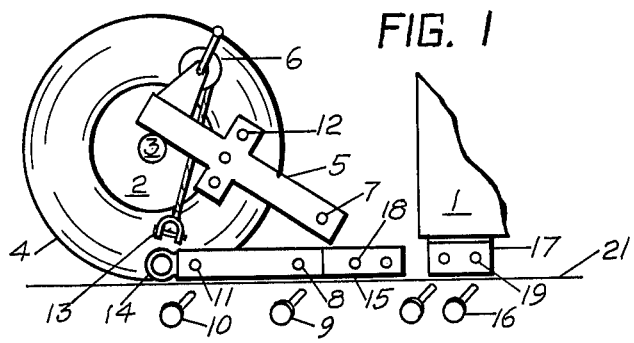
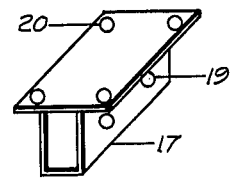
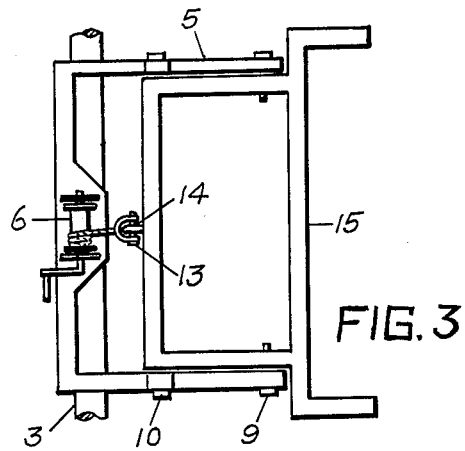
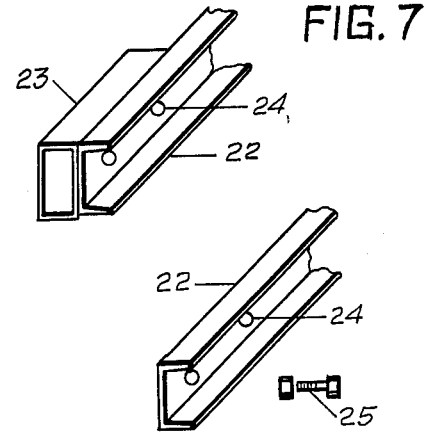
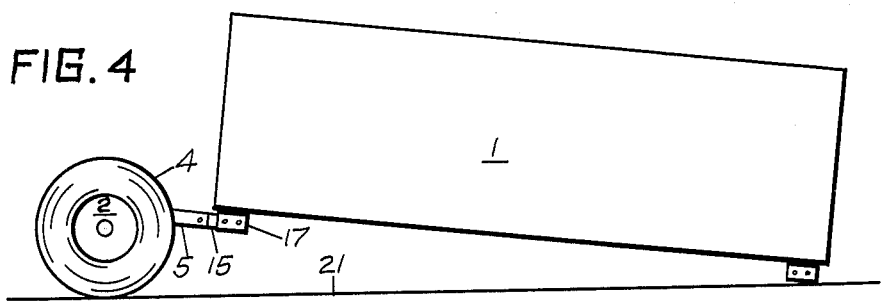
INVENTOR
ELMER H. TALBERT

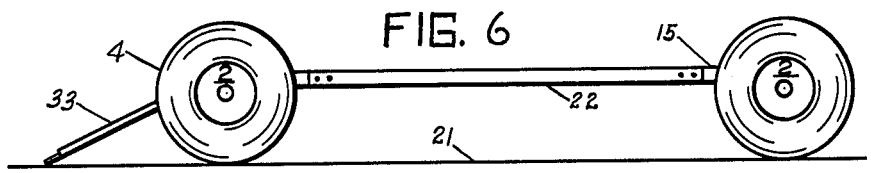
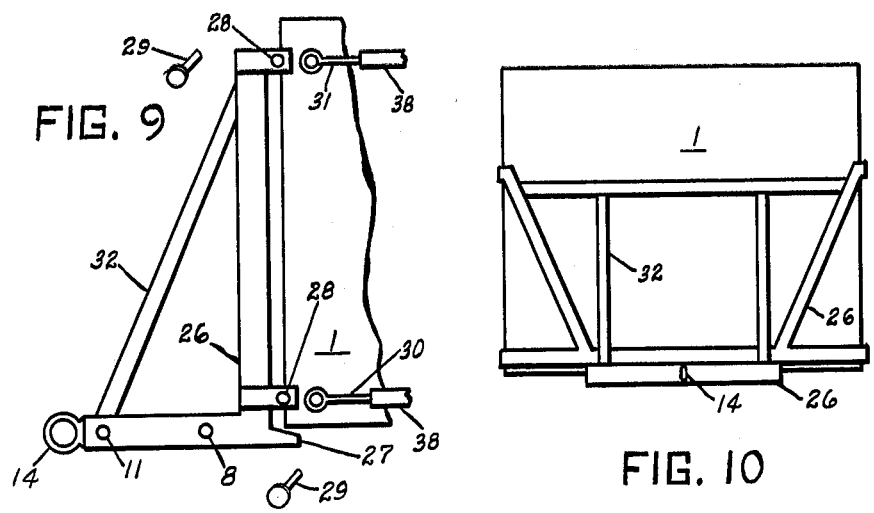
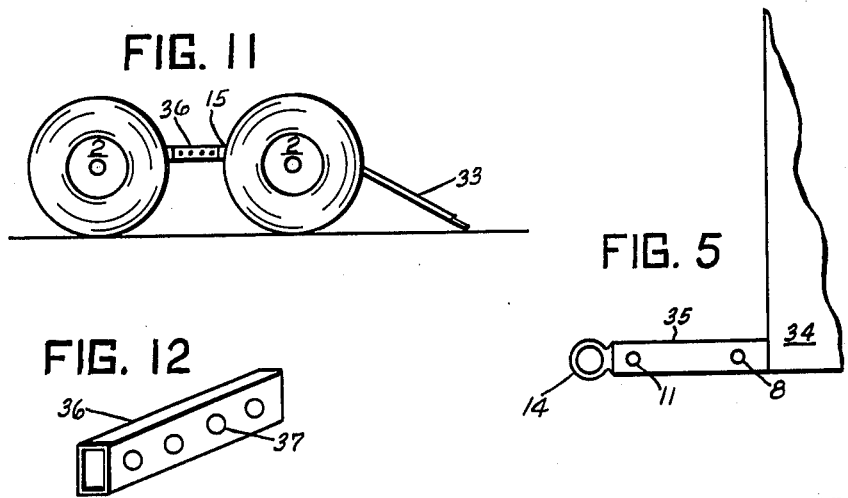

United States Patent Office 3,261,487
Patented July 19, 1966

3,261,487
TRANSPORTING DEVICE AND ACCESSORY ELEMENTS
Elmer H. Talbert, R.D. 1, Georgetown, Del.
Filed June 22, 1964, Ser. No. 376,925
3 Claims. (Cl. 214—390)

The present invention relates to transporting devices, including accessory elements, which may be readily attached to a variety of heavy and cumbersome loads, and which will facilitate the elevation, movement and transportation of said loads for short or long distances, over roads or unimproved terrain or other problem areas.

Examples of such loads include large shipping containers, electronic shelters, body units and also sets of rails or frame members which could be used to carry said heavy and cumbersome loads.

Objects of the present invention are as follows:

To provide, with combinations of devices, accessory elements which may be permanently connected to a load to provide a means for attaching the transporting devices of this invention.

To provide, with combinations of devices, accessory elements which may be temporarily connected to a load to provide a means for attaching the transporting devices of this invention.

To provide, with a combination of devices, means of attaching the transporting device of this invention— a. To loads equipped with any of the above accessory elements.
 b. To loads equipped with prepared attachment fixtures.
 c. To pairs of rails or to frame adapted or prepared with attachment fixtures.

To provide means for elevating and locking a load to transport position with the transporting device of this invention, after suitable connection between said load and transporting device has been made.

The above and other objects and attending advantages of the present invention will be apparent upon consideration of the following description when made in conjunction with the accompanying drawings wherein similar reference characters refer to similar parts throughout the several views and in which:

FIG. 1 is a side view of a lower corner of a shipping container on which a load-modifying, transporter attaching fixture has been installed, and also a side view of a transporter unit of this invention with accessory connecting member and pins which can be attached. The connecting members have not been fastened to the transporter attaching fixtures on the shipping container. The near dolly wheel is eliminated to show frame details.

FIG. 2 is an enlarged pictorial view of a transporter attaching fixture.

FIG. 3 is a top view of a transporter unit frame and axle with pulling means mounted thereon, and with frame attached to a connecting member.

FIG. 4 is a side view of a shipping container to which one unit of a transporter has been suitably attached by means of accessory elements and wherein elevation of one end of the load has been accomplished.

FIG. 5 is a side view of a lower corner of a special body unit with integral connecting members.

FIG. 6 is a side view of a load in the form of two or more rails or beams with transporter units and certain accessory elements attached to both ends. Elevation of the frame has been accomplished and one of the transporter units has steering capabilities.

FIG. 7 is an enlarged pictorial view of a typical fixture at the end of a rail-type frame member, to which the connecting member from a transporter can be attached.

FIG. 8 is a pictorial view of the end of a rail-type frame member fitted for attachment to a connecting member.

FIG. 9 is a side view of one end of a shipping container, and also a temporary vertical connecting member that can be held firmly against the container by means of the adjustable retaining devices which can be attached to a similar transporter at the opposite end of said shipping container.

FIG. 10 is an end view of the temporary vertical connecting member. Retaining devices are not shown.

FIG. 11 is a view of two transporter units with connecting members interconnected for empty transport by means of an interconnecting member.

FIG. 12 is an enlarged pictorial view of a typical transporter empty interconnecting member.

The present invention is illustrated in FIGS. 1 and 4 as comprising a transporter unit 2, which may be used in pairs, or singly in combination with other transporting means, to elevate and transport a load in the form of a shipping container or body unit 1, on which accessory multiple transporter attaching fixtures 17 of this invention have been installed, after interconnection between said transporter unit 2 and at least two accessory transporter attaching fixtures 17 has been accomplished by means of an accessory connecting member 15 and suitable pins 9, 10 and 16. As shown in FIG. 6, a pair of transporter units 2 are normally provided for opposite ends of a load, but single transporter units 2 may be used in combination with other transporter means, such as a fifth wheel plate to mount on a truck-tractor.

More particularly, each of the transporter units 2 consists of a simple dolly with axle 3, wheels 4 and frame 5 to which pulling means or winch 6, including a cable and a lower attaching device 13, have been suitably attached, it being understood that although one which 6 is shown, multiple winches or hydraulic or other power mechanical means could be employed, and it being further understood that when used in pairs, one of the transporter units 2 could have towing and steering capabilities. The transporter frame 5 is fitted with pairs of connecting holes 7 near the outer ends thereof and with a number of pairs of locking or positioning holes 12 closer to the axle 3. Connecting pins 9 and locking pins 10 are parts of the transporter unit.

As illustrated in all figures, certain accessory elements for use with transporter units 2, are essential components of this invention and afford great versatility for attaching to, elevating and transporting a variety of loads.

One such accessory is a connecting member 15, shown in detail in FIGS. 1 and 3, and also in several other illustrations, as comprising a type of frame member, it being understood that said member could have lateral adjustment capabilities, and it being further understood that under certain conditions of use, the connecting member 15 could consist of two beam members when the transporter attaching fixtures 17 can be spaced apart on the load substantially the same as the width of the transporter unit frame 5. The connecting member 15 is fitted with pairs of connecting holes 8 and pairs of locking holes 11 to match pairs of connecting holes 7 and pairs of locking holes 12 in the transporter unit frame 5, and in which connecting pins 9 and locking pins 10 can be inserted. One or more lifting eyes 14, to which pulling means lower attaching device 13 can be fastened, are fitted on the connecting member 15 near the locking holes 11. Near the opposite ends of the connecting member 15, one or more pairs of connecting holes 18 are fitted and connecting pins 16 are provided in conjunction therewith.

As illustrated in FIGS. 1 and 2, transporter attaching fixtures 17 can be secured to a load 1 by means of bolts, screws or other fasteners will known to the art using attaching holes 20. Connecting holes 19 are provided in the transporter attaching fixtures 17 to coincide with connecting holes 18 in the connecting member 15 to be used in conjunction with connecting pins 16.

As illustrated in FIG. 5, the load may take the form of a special body unit 34 with integral connecting member 35 which are fitted with pairs of connecting holes 8 and locking holes 11 in the same manner as connecting members 15.

When the load is in the form of two or more rails 22 or beam members, as illustrated in FIG. 6, it being understood that said rails 22 or beams could be interconnected to form a frame, and it being further understood that said rails 22 or beams or frame would normally be used to support some form of load, transporter attaching fixtures 17 will not be required, but instead a substitute attaching fixture 23 may be attached to the end of each rail 22 as shown in FIG. 7. Connecting holes 24 are provided in this attaching fixture 23 and rail 22 to coincide with connecting holes 18 in the connecting member 15 to be used in conjunction with connecting pins 16. As an alternate, as shown in FIG. 8, the rails 22 may be fitted with connecting holes 24, and can be fastened to the connecting member 15 by means of bolts 25, instead of using the attaching fixtures 23 and connecting pins 16. The rails 22 may also be fitted as shown as the bottom of a load 1 in FIG. 5.

For temporary attachment of a transporter unit 2 to a load 1, without the use of transporter attaching fixtures 17, or of rail assemblies 22, another component accessory of this invention is a vertical connecting member 26, shown in FIGS. 9 and 10, with two or more integral load supports 27, pairs of connecting holes 8 and pairs of locking holes 11 to match pairs of connecting holes 7 and locking holes 12 in the transporter unit frame 5, and in which connecting pins 9 and locking pins 10 can be inserted. Pairs of holes 28 are provided near the base of the vertical member 26 and other pairs of holes 28 are provided near the top of the vertical member to which lower and upper adjustable retainer devices 30 and 31 may be connected with pins 29. One or more lifting eyes 14, to which pulling means lower attaching device 13 can be fastened, are fitted on the horizontal portion of the vertical connecting member 26 in the proximity of locking holes 11. A strengthening strut 32 may be added for heavy loads.

To connect two transporter units 2 with connecting members 15, together for empty transport, an interconnecting member 36, with connecting holes 37 that coincide with connecting holes 18 in said connecting members 15 on both transporter units 2 can be used in conjunction with connecting pins 16, as shown in FIGS. 11 and 12.

In operation, with a load in the form of a special body unit 34 with integral connecting members 35, as illustrated in FIG. 5, the first step in the use of this invention is to connect a transporter unit 2, as shown in FIG. 1, to the integral connecting members 35 using connecting pins 9 through connecting holes 7 in the transporter unit frame 5 and connecting holes 8 in the integral connecting member 35. The lower attaching device 13 of pulling means 6 is connected to the lifting eye 14 near one end of integral connecting member 35 whereupon the pulling means 6 is actuated until locking holes 11 in the connecting member 35 become aligned with selected locking holes 12 in the transporter unit frame 5 and locking pins 10 can be inserted, thereby completing elevation of one end of load 34, in the same general manner as shown with load 1 in FIG. 4. It may be readily understood that a second transporter unit 2 may be similarly attached to the opposite end of said load 34, thereby elevating both ends and forming a vehicle capable of being pushed or towed, in the latter case by means of a towbar 33 attached to suitable steering mechanism on one of the transporter units 2. The above procedure is reversed to lower and disconnect the load 34 from the transporter units 2.

With a load in the form of a shipping container 1, as shown in FIG. 1, the first step in the use of this invention is to securely fasten transporter attaching fixtures 17 to the bottom of said load 1 by means of bolts, screws, rivets or other conventional fastenings, it being essential that the attaching fixtures 17 be located in exact positions to correctly receive and connect with connecting member 15. With attaching fixtures 17 in place, the appropriate ends of the connecting member 15 can be inserted into pairs of attaching fixtures 17 until holes 18 in the connecting member 15 are aligned with connecting holes 19 in the attaching fixture 17, whereupon connecting pins 16 can be inserted and the connecting member 15 becomes firmly secured to the load 1. After a second connecting member 15 is similarly attached to the opposite end of the shipping container 1, that load acquires the form of a body unit 34 with integral connecting members 35, the use of which in connection with transporter units 2 has been heretofore described.

With a load in the form of rails 22 or beams or frames made up from such members, the use of this invention will vary according to the manner of fitting said rail members 22. When ends of rail members 22 are fitted with connecting holes 8 and locking holes 11, transporter units 2 can be directly connected to the rail members 22 with connecting pins 9 and locking pins 10, and the operation is identical to that described for body unit 34 with integral connecting members 35. When ends of rail members 22 are fitted with attaching fixtures 23, as shown in FIG. 7, connecting members 15 can be securely attached in the same manner described for fastening connecting members 15 to transporter attaching fixtures 17 under a load 1. When ends of rail members 22 are fitted with connecting holes 24 which can be aligned with connecting holes 18 in a connecting member 15, bolts 25 can be used to join the rail members 22 and connecting members 15. In either instance, the addition of the connecting members 15 to the rail members 22 in effect adds connecting holes 8 and locking holes 11 to the rail members 22 so that use of these with transporter units becomes identical to that described for body unit 34 with integral connecting members 35.

With a load in the form of a shipping container 1 that is not to be modified by the addition of transporter attaching fixtures 17, a vertical connecting member 26 can be set next to each end of said load 1 as shown in FIG. 9 and the lower adjustable retaining devices 30 can be attached to both vertical connecting members 26 on both sides of the load, by pins 29 inserted through lower attaching holes 28 in the vertical connecting members 26. The adjusting means 38 can then be actuated to shorten the lower adjustable retaining device 30 thereby pulling the vertical connecting members 26 tightly against both ends of the load 1 with integral load supports 27 projecting under said load 1. The upper adjustable retaining devices can be installed in the same manner. After vertical connecting members 26 are firmly attached to the load 1, they can be used in connection with transporter units 2 in the same manner as connecting members 15, the use of which has been previously described.

For empty transport, as shown in FIG. 11, two transporter units 2, with connecting members 15 connected and locked in place with pins 9 and 10, can be interconnected with the use of empty interconnection members 36 that will fit over the ends of the two connecting members 15 so that holes 18 in both connecting members 15 can be aligned with holes 37 in the interconnection members 36 and connection made with pins 16.

While this invention has been shown and described herein with considerable particularity, it will be readily understood by those skilled in the art that other modifications may be resorted to without departing from the spirit of the invention. Reference will therefore be had to the appended claims for a definition of the limits of the invention.

What is claimed is:

1. A transporter unit for elevating and transporting a load supporting body unit of the type having a frame member secured thereto; comprising a pair of arms detachably projecting outwardly from the bottom portion of said frame member with the outer ends of said arms being connected by a cross member, an axle having a pair of wheels rotatably mounted thereon, a frame mounted on said axle and including a pair of spaced-apart elements, means for detachably connecting said elements adjacent one end thereof to said arms respectively, a cable associated with said frame, said cable being provided at the free end thereof with means for connecting it to said cross member, pulling means mounted on said frame for shortening said cable to bring said arms into substantial alignment with said elements and raise said body unit, and means for connecting said arms with said elements at points between said first-named means and said second-named means.

2. A transporter unit as set forth in claim 1 wherein said pulling means comprises a winch mounted on said frame above said axle.

3. A transporter unit as set forth in claim 2 wherein said first-named connecting means is positioned closely adjacent said body unit.

References Cited by the Examiner

UNITED STATES PATENTS

| | | | |
|---|---|---|---|
| 2,215,529 | 9/1940 | Nazarko | 214—506 |
| 2,531,694 | 11/1950 | Larsen | 214—506 |
| 2,784,812 | 3/1957 | Kindorf. | |
| 2,922,534 | 1/1960 | Vodraska et al. | 214—75 |
| 2,993,573 | 7/1961 | Bloedow. | |

GERALD M. FORLENZA, *Primary Examiner.*

A. MAKAY, *Assistant Examiner.*